(12) United States Patent
Zhang et al.

(10) Patent No.: US 9,982,695 B2
(45) Date of Patent: May 29, 2018

(54) FITTING FOR STRUT CHANNEL

(71) Applicant: Cooper Technologies Company, Houston, TX (US)

(72) Inventors: Zhihui Zhang, Edwardsville, IL (US); James A. Knutson, Highland, IL (US)

(73) Assignee: Cooper Technologies Company, Houston, TX (US)

( * ) Notice: Subject to any disclaimer, the term of this patent is extended or adjusted under 35 U.S.C. 154(b) by 97 days.

(21) Appl. No.: 14/939,773

(22) Filed: Nov. 12, 2015

(65) Prior Publication Data

US 2016/0138633 A1 May 19, 2016

Related U.S. Application Data

(60) Provisional application No. 62/080,102, filed on Nov. 14, 2014.

(51) Int. Cl.
*F16B 7/04* (2006.01)
*F16B 2/24* (2006.01)
*H02G 3/06* (2006.01)

(52) U.S. Cl.
CPC .......... *F16B 7/0433* (2013.01); *H02G 3/0608* (2013.01); *F16B 2/245* (2013.01)

(58) Field of Classification Search
CPC ...... F16B 7/0433; F16B 2/245; H02G 3/0608
See application file for complete search history.

(56) References Cited

U.S. PATENT DOCUMENTS

| 1,319,652 A | 10/1919 | Korns |
| 1,813,545 A | 7/1931 | Reinhold |
| 1,934,760 A | 11/1933 | Awbrey |
| 1,963,908 A | 6/1934 | Manasek |

(Continued)

FOREIGN PATENT DOCUMENTS

| CN | 202416847 U | 9/2012 |
| DE | 7701100 | 5/1977 |

(Continued)

OTHER PUBLICATIONS

A guide to threadlocking adhesives, Reliable Plant, May 28, 2013, (online), retrieved on Apr. 27, 2017, retrieved from the internet, https://web.archive.org/web/20130528020650/http:www.reliableplant.com/Read/27159/Guide-to-threadlooking-adhesives.

(Continued)

*Primary Examiner* — Robert Sandy
*Assistant Examiner* — Louis A Mercado
(74) *Attorney, Agent, or Firm* — Senniger Powers LLP

(57) ABSTRACT

In one aspect, a fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, includes a first clip arm configured to extend into the external fitting groove of the first piece of strut. A second clip arm is configured to extend into the external fitting groove of the second piece of strut. A central portion is connected to and extends between the first and second clip arms. The central portion includes a first dimple configured to receive a tool and a second dimple configured to receive a tool.

17 Claims, 14 Drawing Sheets

(56) References Cited

U.S. PATENT DOCUMENTS

| | | |
|---|---|---|
| 2,307,653 A | 1/1943 | Wright |
| 2,375,513 A | 5/1945 | Bach |
| 2,420,826 A | 5/1947 | Irrgang |
| 2,470,991 A | 5/1949 | Kindorf et al. |
| 2,567,463 A | 9/1951 | Atkinson |
| 2,676,680 A | 4/1954 | Kindort |
| 2,767,609 A | 10/1956 | Cousino |
| 2,767,951 A | 10/1956 | Cousino |
| 2,804,180 A | 8/1957 | Richardson |
| 2,846,169 A | 8/1958 | Sullivan |
| 2,944,642 A | 7/1960 | Evans |
| 3,005,292 A | 10/1961 | Reiland |
| 3,226,069 A | 12/1965 | Clarke |
| 3,266,761 A | 4/1966 | Walton et al. |
| 3,310,264 A | 3/1967 | Appleton |
| 3,312,034 A | 4/1967 | Steinmann |
| 3,396,499 A | 8/1968 | Biffani |
| 3,417,951 A | 12/1968 | Rebentisch, Jr. |
| 3,451,183 A | 6/1969 | Lespagnol et al. |
| 3,463,428 A | 8/1969 | Kindorf et al. |
| 3,486,726 A | 12/1969 | Kindorf et al. |
| 3,513,606 A | 5/1970 | Jones |
| 3,527,432 A | 9/1970 | Lytle |
| 3,547,385 A | 12/1970 | Kindorf et al. |
| 3,566,561 A | 3/1971 | Tozer |
| 3,592,493 A | 7/1971 | Goose |
| 3,601,347 A | 8/1971 | Attwood et al. |
| 3,612,461 A | 10/1971 | Brown |
| 3,650,499 A | 3/1972 | Biggane |
| 3,748,808 A | 7/1973 | Shepard et al. |
| 3,752,198 A | 8/1973 | Fiorentino et al. |
| 3,757,485 A | 9/1973 | Vincens |
| 3,836,936 A | 9/1974 | Clement |
| 3,863,300 A | 2/1975 | Becker |
| 3,944,308 A | 3/1976 | Persson |
| 3,986,314 A | 10/1976 | Moeller |
| 3,998,419 A | 12/1976 | Semmerling |
| 4,044,428 A | 8/1977 | Kowalski |
| 4,185,802 A | 1/1980 | Myles et al. |
| 4,211,381 A | 7/1980 | Heard |
| 4,216,930 A | 8/1980 | Rossler, Jr. et al. |
| 4,227,355 A | 10/1980 | Wendt |
| 4,358,216 A | 11/1982 | Pleickhardt et al. |
| 4,379,651 A | 4/1983 | Nagashima |
| 4,397,437 A | 8/1983 | Madej |
| 4,417,711 A | 11/1983 | Madej |
| 4,479,341 A | 10/1984 | Schuplin |
| 4,490,064 A | 12/1984 | Ducharme |
| 4,506,418 A | 3/1985 | Viola et al. |
| 4,516,296 A | 5/1985 | Sherman |
| 4,556,148 A | 12/1985 | Koller |
| 4,610,562 A | 9/1986 | Dunn |
| 4,637,748 A | 1/1987 | Beavers |
| 4,652,170 A | 3/1987 | Lew |
| 4,657,458 A | 4/1987 | Waller et al. |
| 4,666,355 A | 5/1987 | Stover |
| 4,708,554 A | 11/1987 | Howard |
| 4,726,165 A | 2/1988 | Brinsa |
| 4,729,532 A | 3/1988 | Moss |
| 4,784,552 A | 11/1988 | Rebentisch |
| 4,830,531 A | 5/1989 | Condit et al. |
| 4,895,412 A | 1/1990 | Deley et al. |
| 4,934,886 A | 6/1990 | Aikens |
| 4,948,313 A | 8/1990 | Zankovich |
| 4,950,099 A | 8/1990 | Roellin |
| 4,961,553 A | 10/1990 | Todd |
| 4,962,914 A | 10/1990 | Taylor |
| 4,993,670 A | 2/1991 | Tesar |
| 5,003,741 A | 4/1991 | Yeh |
| 5,014,940 A | 5/1991 | Sherman |
| 5,022,614 A | 6/1991 | Rinderer |
| D322,929 S | 1/1992 | Abbestam et al. |
| 5,078,537 A | 1/1992 | Nomura |
| 5,102,074 A | 4/1992 | Okada |
| 5,116,161 A | 5/1992 | Faisst |
| 5,118,233 A | 6/1992 | Mitchell |
| 5,127,758 A | 7/1992 | Kreusel |
| 5,141,186 A | 8/1992 | Cusic |
| 5,146,724 A | 9/1992 | Angelo |
| 5,163,644 A | 11/1992 | Kowalski |
| 5,175,971 A | 1/1993 | McCombs |
| 5,205,022 A | 4/1993 | Norton |
| 5,215,281 A | 6/1993 | Sherman |
| 5,228,263 A | 7/1993 | Vaughn |
| 5,271,586 A | 12/1993 | Schmidt |
| 5,274,888 A | 1/1994 | Payne |
| 5,292,013 A | 3/1994 | Earl |
| 5,335,890 A | 8/1994 | Pryor et al. |
| 5,351,926 A | 10/1994 | Moses |
| 5,356,234 A | 10/1994 | Vangool |
| 5,375,798 A | 12/1994 | Hungerford, Jr. |
| 5,489,173 A | 2/1996 | Hofle |
| 5,503,511 A | 4/1996 | Flamme |
| 5,531,539 A | 7/1996 | Crawford |
| 5,566,916 A | 10/1996 | Bailey |
| 5,595,363 A | 1/1997 | De Leebeeck |
| 5,628,508 A | 5/1997 | Koole |
| 5,655,816 A | 8/1997 | Magnuson et al. |
| 5,655,865 A | 8/1997 | Plank et al. |
| 5,718,403 A | 2/1998 | Ott et al. |
| 5,729,948 A | 3/1998 | Levy et al. |
| 5,746,535 A | 5/1998 | Kohler |
| 5,779,412 A | 7/1998 | Nagai et al. |
| 5,799,452 A | 9/1998 | Moore |
| 5,799,907 A | 9/1998 | Andronica |
| 5,806,268 A | 9/1998 | Koller |
| 5,806,897 A | 9/1998 | Nagai et al. |
| 5,820,322 A | 10/1998 | Hermann et al. |
| 5,833,417 A | 11/1998 | Sargent et al. |
| 5,855,342 A | 1/1999 | Hawkins et al. |
| 5,864,997 A | 2/1999 | Kelly |
| 5,915,803 A | 6/1999 | Daugherty et al. |
| 5,918,999 A | 7/1999 | Lamarca |
| 5,924,650 A | 7/1999 | Richichi |
| 5,927,041 A | 7/1999 | Sedlmeier et al. |
| 5,934,818 A | 8/1999 | Schmitt et al. |
| 5,970,679 A | 10/1999 | Amore |
| 5,984,243 A | 11/1999 | Pfaller et al. |
| 5,988,930 A | 11/1999 | Liebetrau et al. |
| D421,655 S | 3/2000 | Daugherty et al. |
| 6,061,984 A | 5/2000 | Rose |
| 6,062,764 A | 5/2000 | Rixen et al. |
| 6,106,189 A | 8/2000 | Seale |
| 6,195,953 B1 | 3/2001 | Gitter et al. |
| 6,322,030 B1 | 11/2001 | Marra |
| 6,347,904 B1 | 2/2002 | Knighton |
| 6,454,232 B1 | 9/2002 | Roth |
| 6,484,358 B1 | 11/2002 | Duong et al. |
| 6,494,415 B1 | 12/2002 | Roth |
| 6,554,235 B1 | 4/2003 | Fortier |
| 6,561,473 B1 | 5/2003 | Ianello |
| 6,572,057 B1 | 6/2003 | Roth |
| 6,588,713 B2 | 7/2003 | Kilkenny |
| 6,655,099 B1 | 12/2003 | Trenoweth |
| 6,660,938 B2 | 12/2003 | Herb et al. |
| 6,679,461 B1 | 1/2004 | Hawkins |
| 6,682,253 B2 | 1/2004 | Binna et al. |
| 6,712,543 B1 | 3/2004 | Schmalzhofer |
| 6,726,117 B2 | 4/2004 | Herb et al. |
| 6,751,914 B2 | 6/2004 | Zeh et al. |
| 6,766,992 B1 | 7/2004 | Parker |
| 6,802,171 B2 | 10/2004 | McKinnon |
| 6,899,511 B2 | 5/2005 | Gurevich et al. |
| 6,991,198 B1 | 1/2006 | Roth |
| 7,014,213 B1 | 3/2006 | Kaiser |
| 7,044,701 B2 | 5/2006 | Herb |
| 7,070,374 B2 | 7/2006 | Womack et al. |
| 7,096,641 B2 | 8/2006 | Birnbaum et al. |
| 7,165,361 B2 | 1/2007 | Vanagan |
| 7,179,010 B2 | 2/2007 | Weger et al. |
| 7,240,884 B2 | 7/2007 | Shim |
| 7,287,733 B2 | 10/2007 | Bongio et al. |
| 7,389,621 B2 | 6/2008 | Hawes |
| 7,448,822 B2 | 11/2008 | Nebeker et al. |

(56) References Cited

U.S. PATENT DOCUMENTS

| | | |
|---|---|---|
| 7,478,787 B2 | 1/2009 | Bankston et al. |
| 7,484,697 B1 | 2/2009 | Nelson |
| 7,600,724 B2 | 10/2009 | Nelson et al. |
| 7,604,444 B2 | 10/2009 | Wu |
| 7,661,915 B2 | 2/2010 | Whipple |
| 7,818,925 B2 | 10/2010 | Benedict |
| 7,922,130 B2 | 4/2011 | Hawkins |
| 7,922,417 B2 | 4/2011 | Jimenez |
| 7,934,896 B2 | 5/2011 | Schnier |
| 7,984,601 B2 | 7/2011 | Birnbaum et al. |
| 3,020,328 A1 | 9/2011 | Lavi et al. |
| 8,100,600 B2 | 1/2012 | Blum |
| D654,064 S | 2/2012 | Sergi |
| 8,225,581 B2 | 7/2012 | Strickland et al. |
| 8,277,158 B2 | 10/2012 | Csik et al. |
| 8,303,223 B2 | 11/2012 | Rass et al. |
| 8,341,913 B2 | 1/2013 | Meres et al. |
| 8,366,340 B2 | 2/2013 | Munakata et al. |
| 8,454,259 B2 | 6/2013 | Oetlinger |
| 8,511,929 B2 | 8/2013 | Raye et al. |
| 8,523,923 B2 | 9/2013 | Thomke et al. |
| 8,567,030 B2 | 10/2013 | Koch et al. |
| 8,596,009 B2 | 12/2013 | Baxter et al. |
| 8,661,765 B2 | 3/2014 | Schaefer et al. |
| 8,662,455 B2 | 3/2014 | Hernandez et al. |
| 8,695,296 B2 | 4/2014 | Bergman |
| D728,753 S | 5/2015 | Hikoyama |
| 9,187,898 B1 | 11/2015 | Underkofler et al. |
| 9,194,418 B2 | 11/2015 | Parthibhan et al. |
| 9,249,994 B2 | 2/2016 | Zuritis |
| 9,651,171 B2 | 5/2017 | Zhang et al. |
| 9,746,105 B2 | 8/2017 | Zhang et al. |
| 2002/0000498 A1 | 1/2002 | Workman |
| 2002/0060280 A1 | 5/2002 | Yaphe et al. |
| 2002/0110435 A1 | 8/2002 | Herb et al. |
| 2002/0122691 A1 | 9/2002 | Wood |
| 2003/0042033 A1 | 3/2003 | Herb et al. |
| 2003/0043033 A1 | 3/2003 | Lee |
| 2003/0063961 A1 | 4/2003 | Lay |
| 2003/0122044 A1 | 7/2003 | Unverzagt et al. |
| 2003/0159397 A1 | 8/2003 | Birnbaum |
| 2003/0185643 A1 | 10/2003 | Thompson |
| 2004/0165943 A1 | 8/2004 | Herb |
| 2004/0165947 A1 | 8/2004 | Herb |
| 2004/0165965 A1 | 8/2004 | Unverzagt et al. |
| 2004/0228681 A1 | 11/2004 | Herb |
| 2005/0116123 A1 | 6/2005 | Bailey et al. |
| 2005/0129458 A1 | 6/2005 | Hoffmann |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |
| 2007/0248793 A1 | 10/2007 | Herb et al. |
| 2008/0217490 A1 | 9/2008 | Bucciferro et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1 | 5/2012 | Chen |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2013/0047541 A1 | 2/2013 | Mayer |
| 2014/0042286 A1 | 2/2014 | Jaffari |
| 2014/0091050 A1 | 4/2014 | Zhang |
| 2014/0093307 A1 | 4/2014 | Zhang |
| 2014/0097304 A1 | 4/2014 | Mastro |
| 2014/0197284 A1 | 7/2014 | Hikoyama |
| 2014/0260083 A1 | 9/2014 | Zhang et al. |
| 2014/0283475 A1 | 9/2014 | Zhang et al. |
| 2015/0176631 A1 | 6/2015 | McCarthy et al. |
| 2015/0276092 A1 | 10/2015 | Oliver et al. |
| 2015/0316178 A1 | 11/2015 | Patil et al. |
| 2015/0316203 A1 | 11/2015 | Zhang et al. |
| 2015/0322669 A1 | 11/2015 | Shih |
| 2016/0138633 A1 | 5/2016 | Zhang et al. |

FOREIGN PATENT DOCUMENTS

| | | | |
|---|---|---|---|
| DE | 8232700 | 6/1983 | |
| DE | 3513382 A1 | 10/1986 | |
| DE | 8704502 | 7/1987 | |
| DE | 102006035405 A1 | 5/2008 | |
| DE | 202010004406 U1 | 8/2010 | |
| DE | 102009000603 A1 | 9/2010 | |
| DE | 20 2012 102 394 U1 | 9/2012 | |
| EP | 0 592 743 A1 | 10/1992 | |
| EP | 2838170 B1 * | 3/2016 | ........... H02G 3/0443 |
| GB | 569377 | 5/1945 | |
| GB | 687403 | 2/1953 | |
| GB | 1157545 | 7/1969 | |
| GB | 1370645 | 10/1974 | |
| JP | 2000-139583 A | 5/2000 | |
| WO | 98/37349 | 8/1998 | |
| WO | 2006085185 A1 | 8/2006 | |
| WO | 2013125821 A1 | 8/2013 | |
| WO | 2014159372 A1 | 10/2014 | |

OTHER PUBLICATIONS

International Search Report and Written Opinion for PCT/US2015/060589, dated Jan. 27, 2016, 12 pages.
Drawing of MQM Wing Nut, (at least as early as Mar. 13, 2012), 1 page.
Hilti MI/MZ Technical Guide, 4.2 MQ System Components—Load Data and Material Specifications, MQM Wing Nut, (at least as early as Mar. 13, 2012), 1 page, www.us.hilti.com, Canada.
B-Line by Eaton—Channel Nuts & Hardware, Strut Systems, (at least as early as Mar. 13, 2012), pp. 45-53.
Power-Strut Engineering Catalog, Pictorial Table of Contents, (at least as early as Mar. 13, 2012), pp. 11-14, www.alliedeg.com.
Unistrut, Channels Nuts, Top Retainer Nut, (at least as early as Mar. 13, 2012), 1 page.
Unistrut, P1000® & P1001 Channels, (at least as early as Mar. 13, 2012), 1 page.
Unistrut, P1100® & P1101 Channels, (at least as early as Mar. 13, 2012), 1 page.
Unistrut, P2000® & P2001 Channels, (at least as early as Mar. 13, 2012), 1 page.
Unistrut General Engineering Catalog, Unistrut Corporation, Mar. 1, 1998; pp. 117, 118.
Power-Strut® Engineering Catalog, Tyco International, 2008, pp. 63, 65.
"Dovetail" Google.com, retrieved online on Sep. 18, 2017 from URL:https://www.google.com/search?q+define%A+dovetail.

* cited by examiner

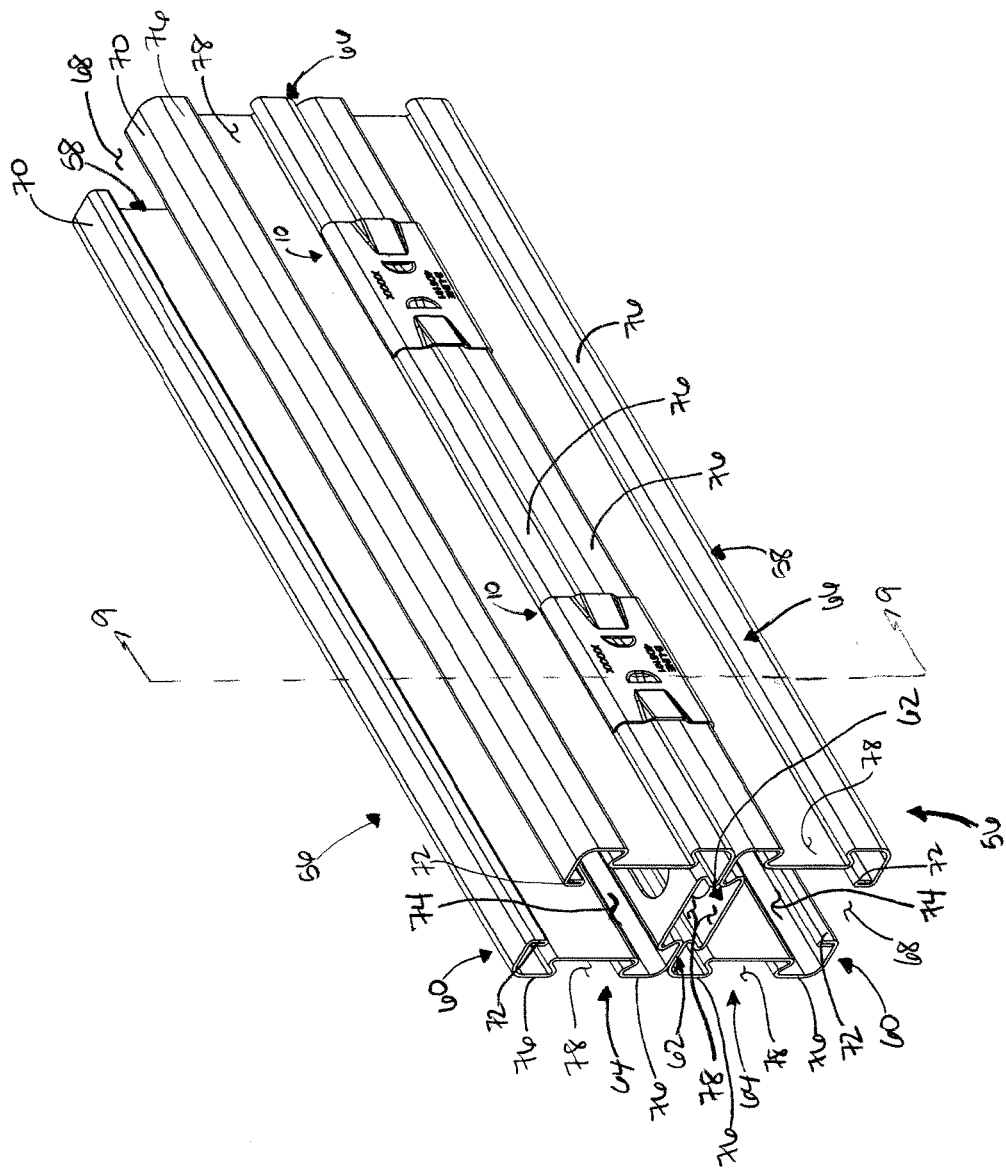

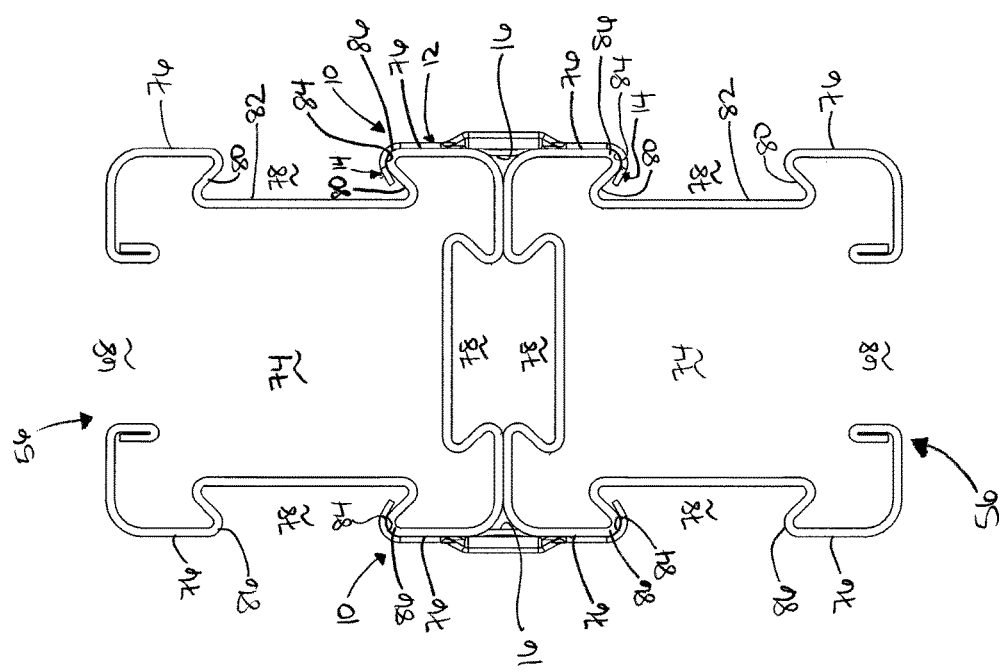

FITTING FOR STRUT CHANNEL

FIELD OF THE DISCLOSURE

The present disclosure generally relates to a fitting for use with strut channel.

BACKGROUND

Strut channel or channel framing, also referred to as simply "strut," is used in the construction and electrical industries for structural support, often for supporting wiring, plumbing, or mechanical components such as air conditioning or ventilation systems. Strut is usually formed from metal sheet, folded over into an open channel shape with interned lips to provide additional stiffness and as a location to mount fittings for securing one or more components to the strut. In some applications, it is desirable to mount pieces of strut together in side-by-side relationship. The conventional way to attach multiple pieces of strut is to weld the strut together, which is time consuming and costly. In addition, these attached pieces of strut cannot be easily disassembled or otherwise changed, such as at the job site, to account for changes during the course of installing strut channel.

SUMMARY

In one aspect, a fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, comprises a first clip arm configured to extend into the external fitting groove of the first piece of strut. A second clip arm is configured to extend into the external fitting groove of the second piece of strut. A central portion is connected to and extends between the first and second clip arms. The central portion includes a first dimple configured to receive a tool and a second dimple configured to receive a tool.

In another aspect, a fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, comprises a first clip arm configured to extend into the external fitting groove of the first piece of strut. A second clip arm is configured to extend into the external fitting groove of the second piece of strut. A central portion is connected to and extends between the first and second clip arms. The central portion includes a first pocket configured to receive a tool at a first longitudinal end and a second pocket configured to receive a tool at a second longitudinal end opposite the first longitudinal end.

BRIEF DESCRIPTION OF THE DRAWINGS

FIG. 6 is a side elevation of the fitting;
FIG. 7 is a perspective of two pieces of strut with the two fittings attaching the pieces of strut together;
FIG. 8 is a front elevation of FIG. 7.

DETAILED DESCRIPTION

Figure 1:
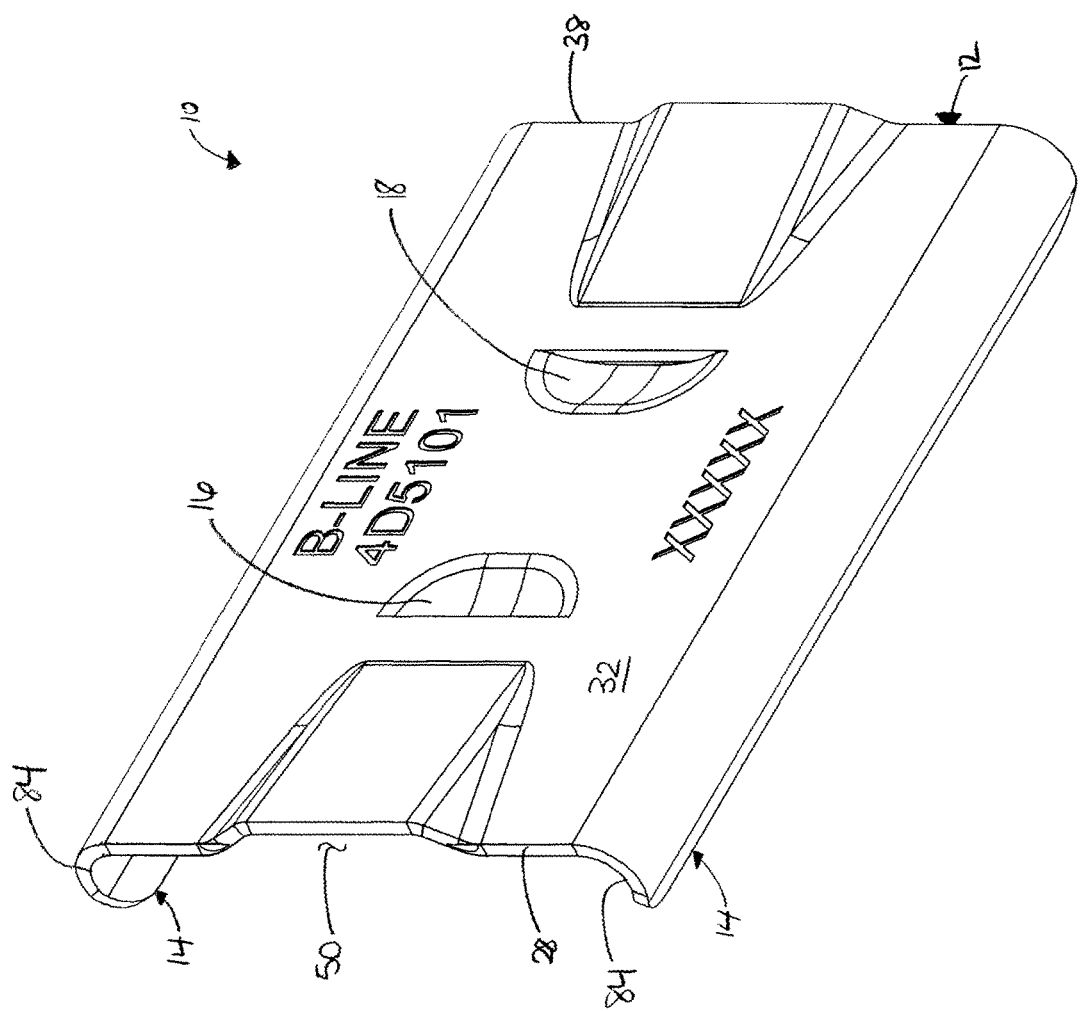
FIG. 1 is a perspective of a fitting for use in connecting two pieces of strut together.
Figure 2:
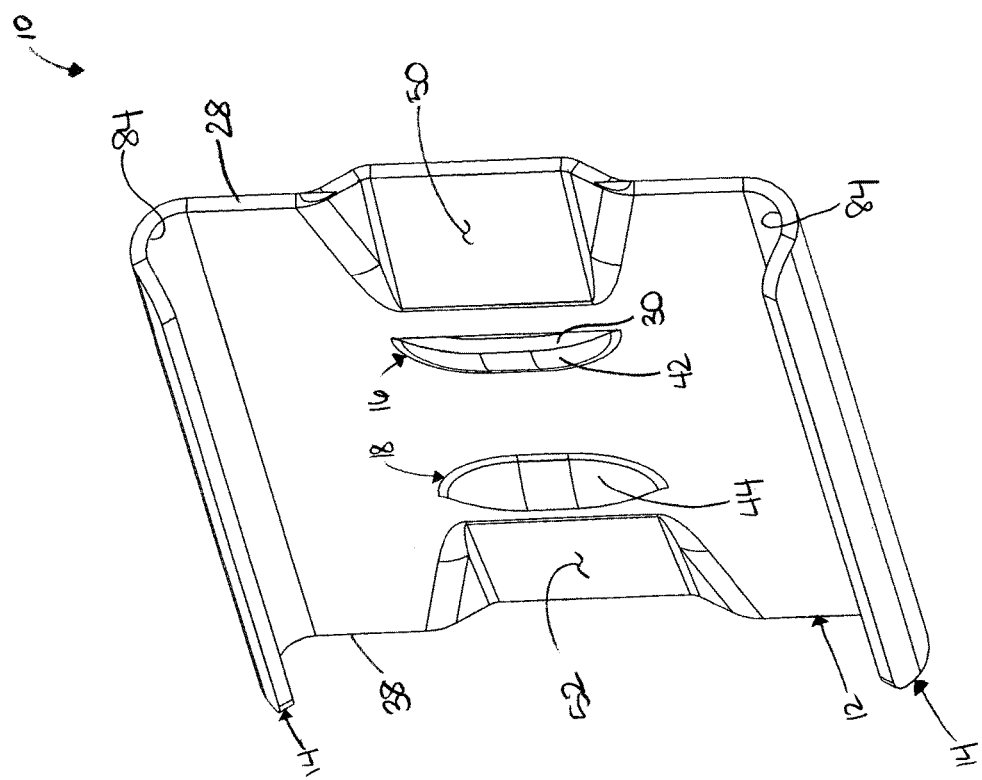
FIG. 2 is a rear perspective of FIG. 1.
Figure 3:
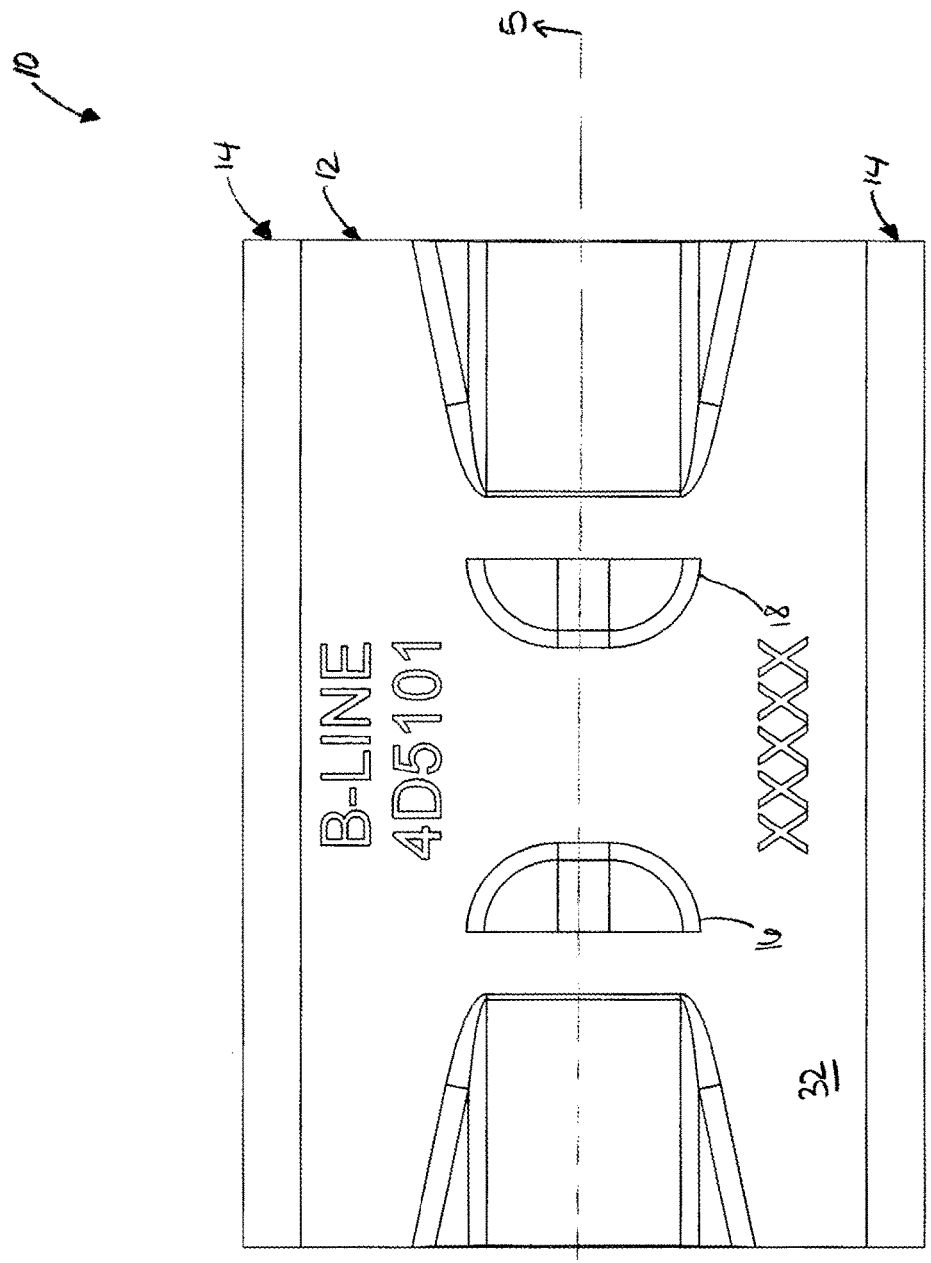
FIG. 3 is a front elevation of FIG. 1.
Figure 4:
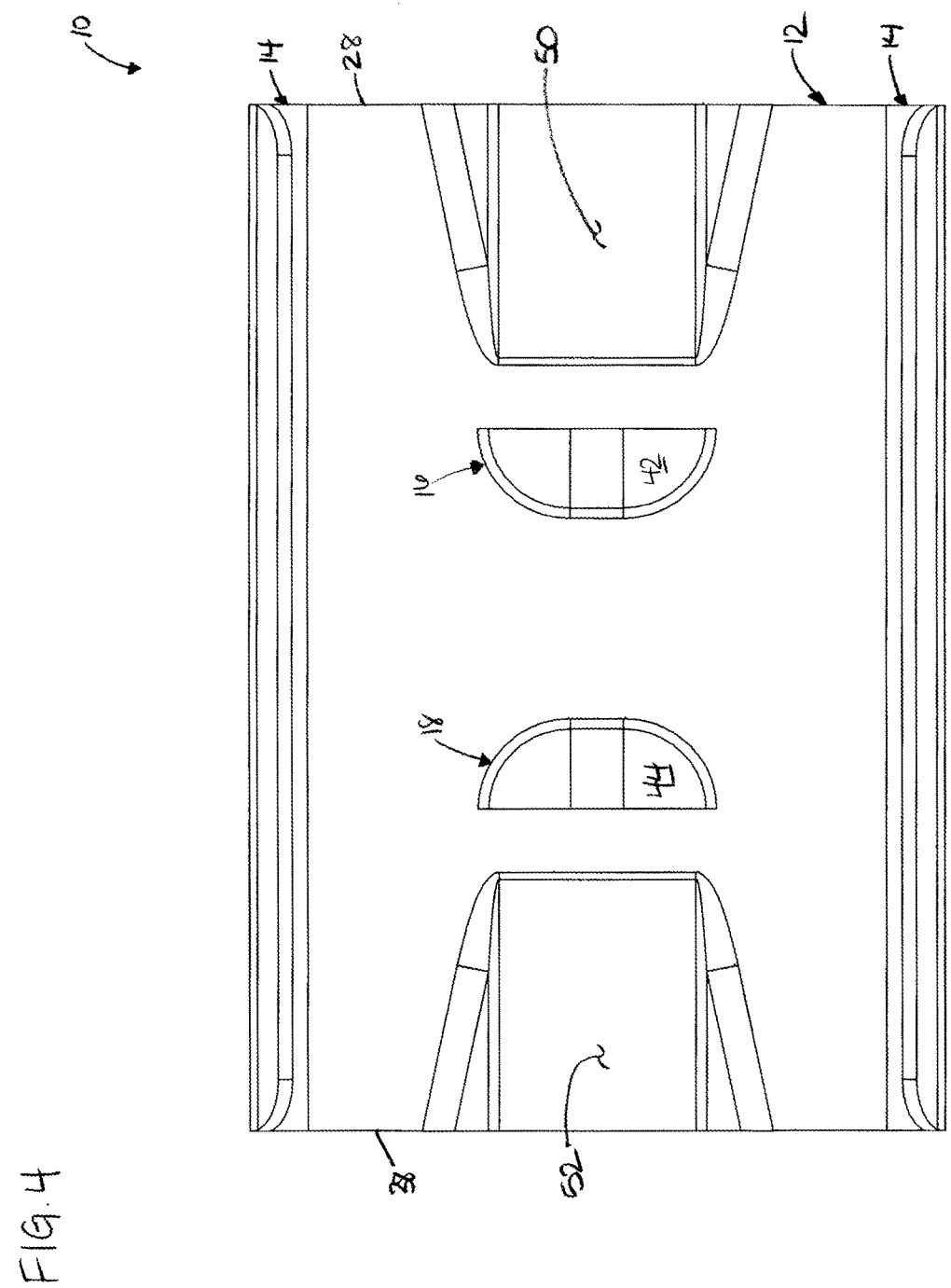
FIG. 4 is a rear elevation of FIG. 1.

Referring to FIGS. 1-6, a fitting for mounting together strut channel (also referred to in the below disclosure as simply "strut") is generally indicated at 10. The fitting 10 is configured for use with strut having a fitting attachment structure, as described in detail below. In the illustrated embodiment, the fitting 10 is generally in the form of a clip that is adapted to connect two pieces of strut to one another in a side-by-side arrangement. The clip 10 is configured for use with strut having a dovetail fitting attachment structure, although other fitting and fitting attachment structure configurations are within the scope of the present invention.

Referring still to FIGS. 1-6, the clip 10 comprises an elongate body having a central portion 12 and two clip arms or jaws 14 (broadly, coupling components) extending outward from opposite sides of the body. The clip arms 14 are configured to engage a strut fitting attachment structure, as described below. The central portion 12 of the clip 10 is generally planar. The clip arms 14 extend at an angle (e.g., about 45 degrees) relative to the central portion 12. The clip 10 may be formed from metal, such as steel, spring steel, or aluminum, or from other materials.

Figure 5:
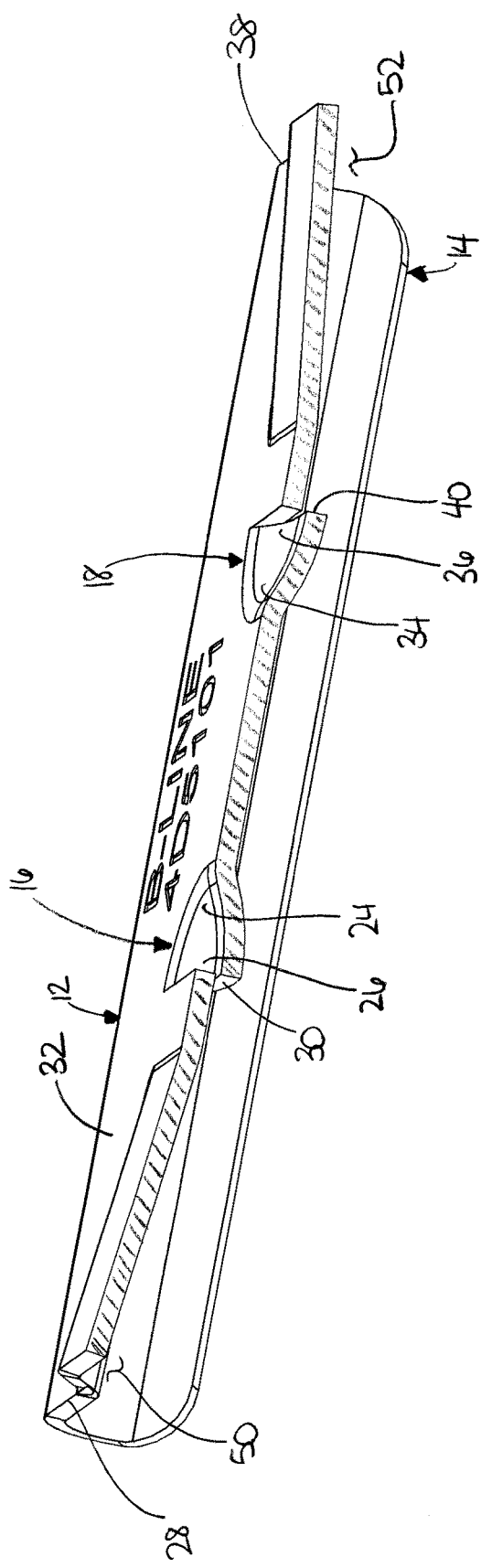
FIG. 5 is a perspective of a section of the fitting taken along line 5-5 of FIG. 3.

The central portion 12 of the clip 10 includes first and second dimples 16, 18 at spaced locations. Each of the dimples 16, 18 is sized and shaped for providing a surface for catching the end of a tool (e.g., a flathead screwdriver). The first dimple 16 has a shallow end 24 and a deep end 26 (FIG. 5). The deep end 26 is closer to a first end 28 of the clip 10 than the shallow end 24. A wall 30 at the deep end 26 of the dimple 16 forms an abutting surface for catching the tool. For example, as illustrated, the wall 30 is generally orthogonal to an upper surface 32 of the clip 10. Similarly, the second dimple 18 has a shallow end 34 and a deep end 36 closer to a second end 38 of the clip 10 than the shallow end 34 (FIG. 5). A wall 40 at the deep end 36 of the dimple 18 forms an abutting surface for catching the tool. For example, as illustrated, the wall 40 is generally orthogonal to the upper surface 32 of the clip 10. Each of the dimples 16, 18 includes a rear surface 42, 44 (FIG. 2) configured to create friction with the pieces of strut to which the clip 10 is attached, as described below.

The central portion 12 of the clip 10 also includes first and second pockets 50, 52 to facilitate removal of the clip from the strut fitting attachment structure. A portion of the upper surface 32 adjacent the first end 28 of the clip 10 is raised to form the first pocket 50 for receiving the end of a tool (e.g., screwdriver). Likewise, a portion of the upper surface 32 adjacent the second end 38 of the clip 10 is raised to form the second pocket 52 for receiving the end of a tool (e.g., screwdriver). Each pocket 50, 52 is sized and shaped to receive the end of a flathead screwdriver. Each pocket 50, 52 is tapered inward from its open end to generally conform to the shape of a flathead screwdriver.

The clip 10 is configured for attachment to illustrated strut 56. In general, referring to FIGS. 7-14, the strut 56 has an elongate body 58 extending along a longitudinal axis. The elongate body 58 has a generally square or rectangular cross-sectional shape having an upper side 60, a lower side 62, a right side 64, and a left side 66 (each indicated generally). The upper side 60 defines a continuous slot 68 (i.e., the upper side is open). The upper side 60 has outside surfaces 70 on either side of the slot 68, and inwardly (or downwardly) depending lips 72 leading to an open interior 74 of the strut 56. The strut 56 includes one or more fitting grooves 78 extending lengthwise of the body 58. For example, the strut can be strut as described in co-pending U.S. application Ser. No. 13/966,897 filed Aug. 14, 2013, the entirety of which is hereby incorporated by reference. Each of the lower, right, and left sides 62, 64, 66, respectively, can define a fitting groove 78 (see, e.g., FIG. 7). Alternatively, at least the side (e.g., lower side 62) opposite the slotted side (e.g., upper side 60) defines a fitting groove 78, while the other two sides (e.g., the right and left sides 64, 66) may or may not define fitting grooves (not shown). Alternatively, the strut may include at least one fitting groove 78 and no continuous slot (i.e., the upper side is closed).

Each fitting groove 78 is defined by opposing side walls 80 extending inwardly from generally planar outer surfaces 76 of the corresponding side 62, 64, 66 and toward the interior 74 of the body 58 (FIG. 8). The side walls 80 extend to a bottom wall 82 that spans between and interconnects the side walls. The side walls 80 flare away from one another as they extend inward from the outer surfaces toward the bottom 82 of the fitting groove 78 so that each fitting groove has a generally dovetail cross-sectional shape. Accordingly, each fitting groove 78 has a first relatively narrower width (e.g., a minimum width) at its entrance and a second relatively wider width (e.g., a maximum width) adjacent the bottom wall 82. In the illustrated embodiment, each fitting groove 78 has a dovetail cross-sectional shape, although each fitting may have other cross-sectional shapes. In general, the fitting grooves 78 are configured for receiving a coupling component of a fitting for use in attaching or securing the fitting to any one of the sides 62, 64, 66 of the strut channel 56.

Figure 9:
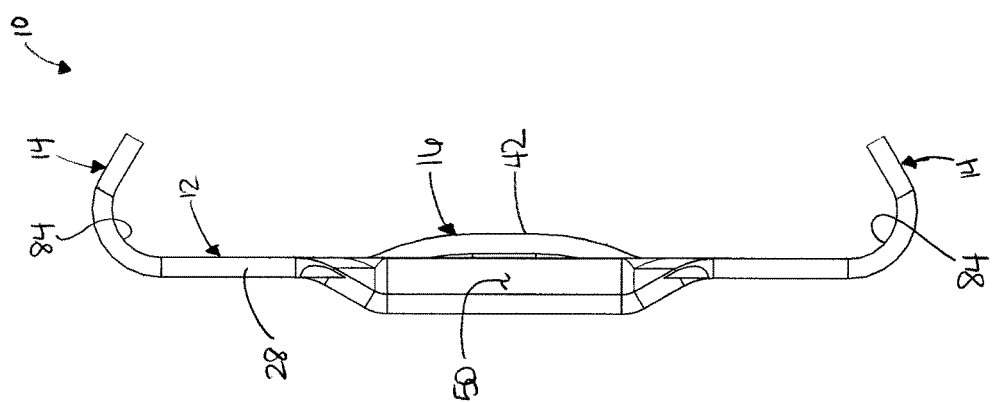
FIG. 9 is a front elevation of a section taken along line 9-9 of FIG. 7.
Figure 9:
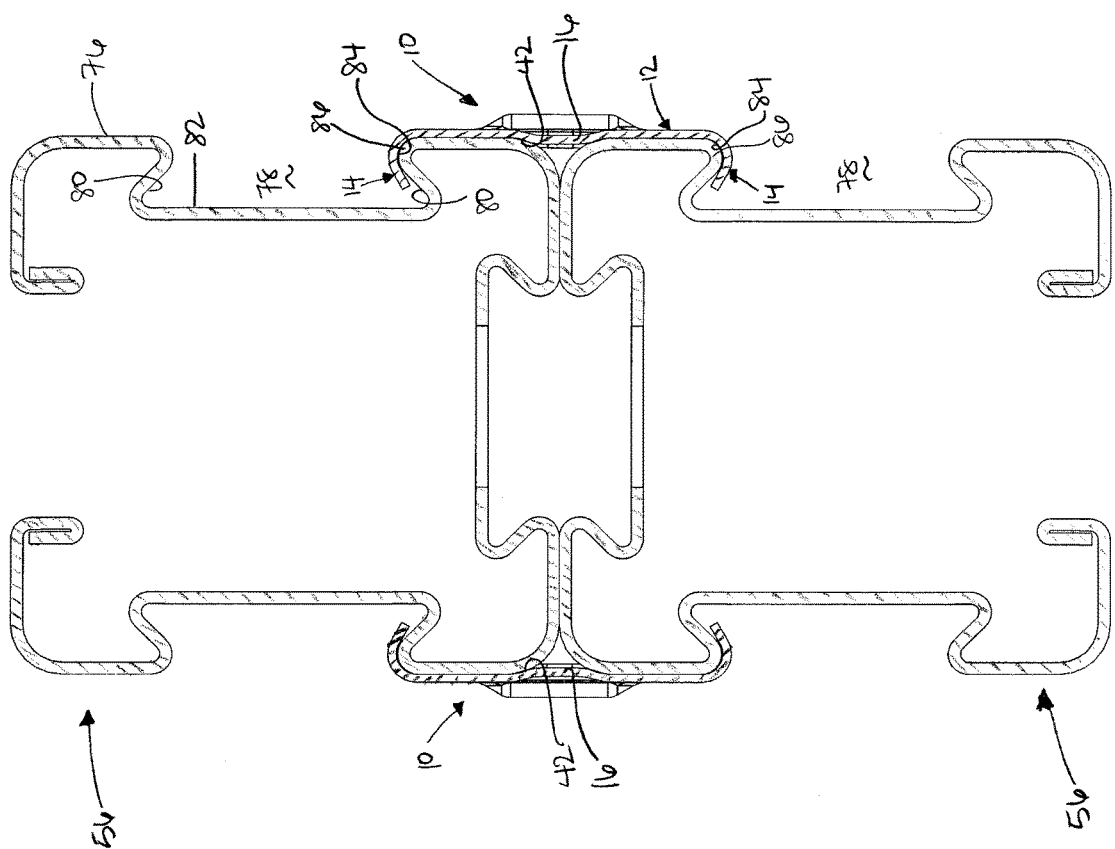
Figure 10:
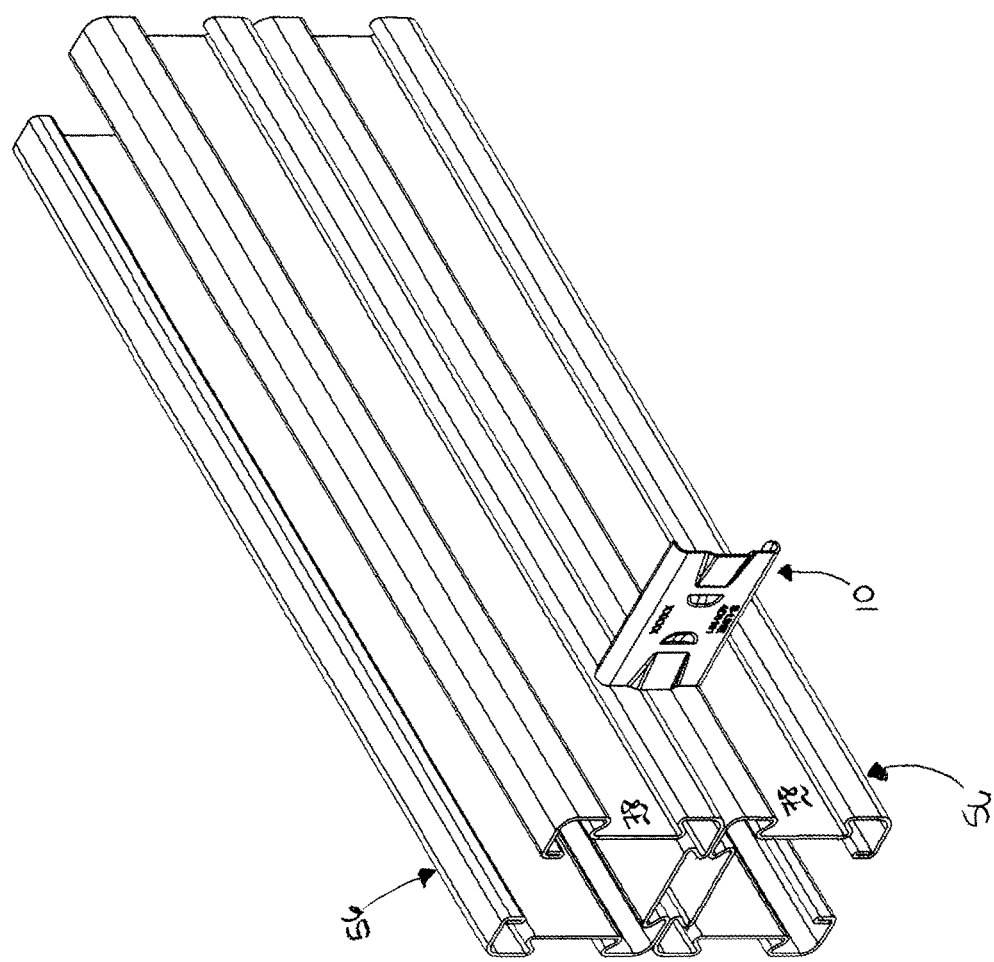
FIG. 10 is a perspective of the two pieces of strut and a fitting prior to attachment of the fitting to the strut.
Figure 11:
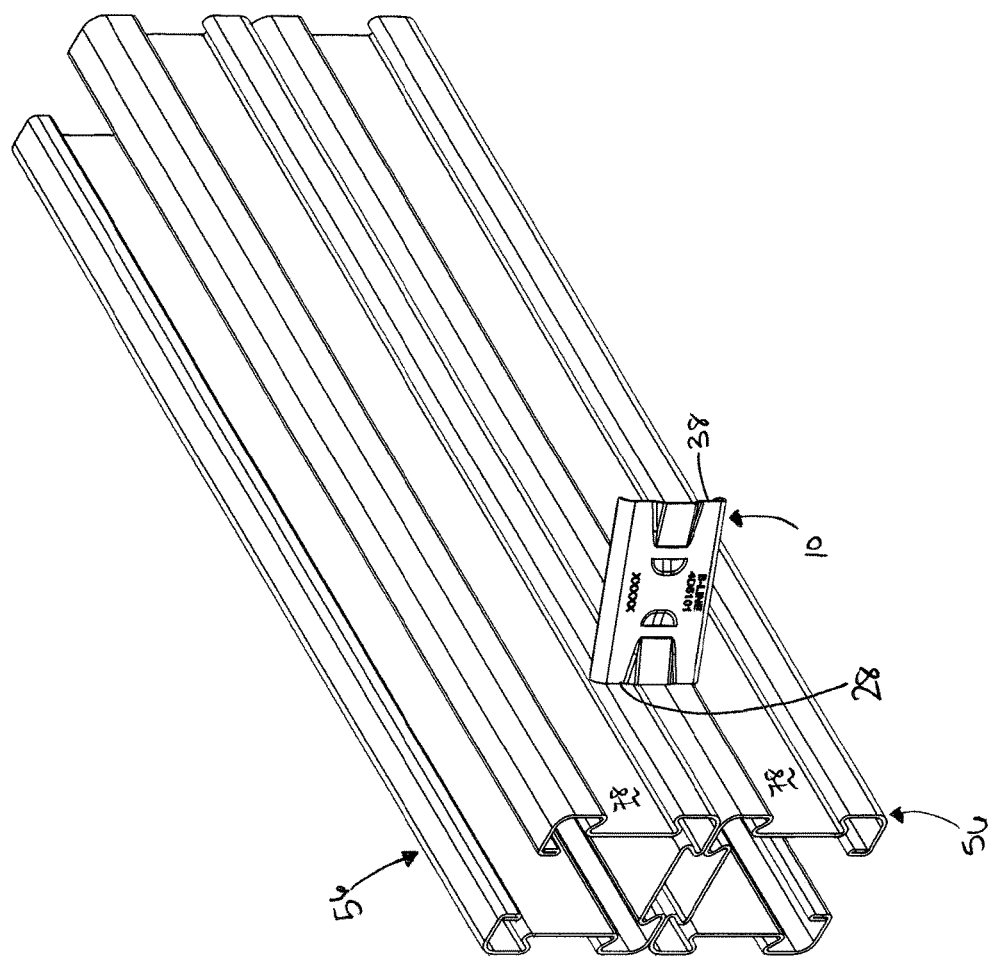
FIG. 11 is a perspective similar to FIG. 10, illustrating the fitting moved into position so that a first end of the fitting engages the two pieces of strut.
Figure 12:
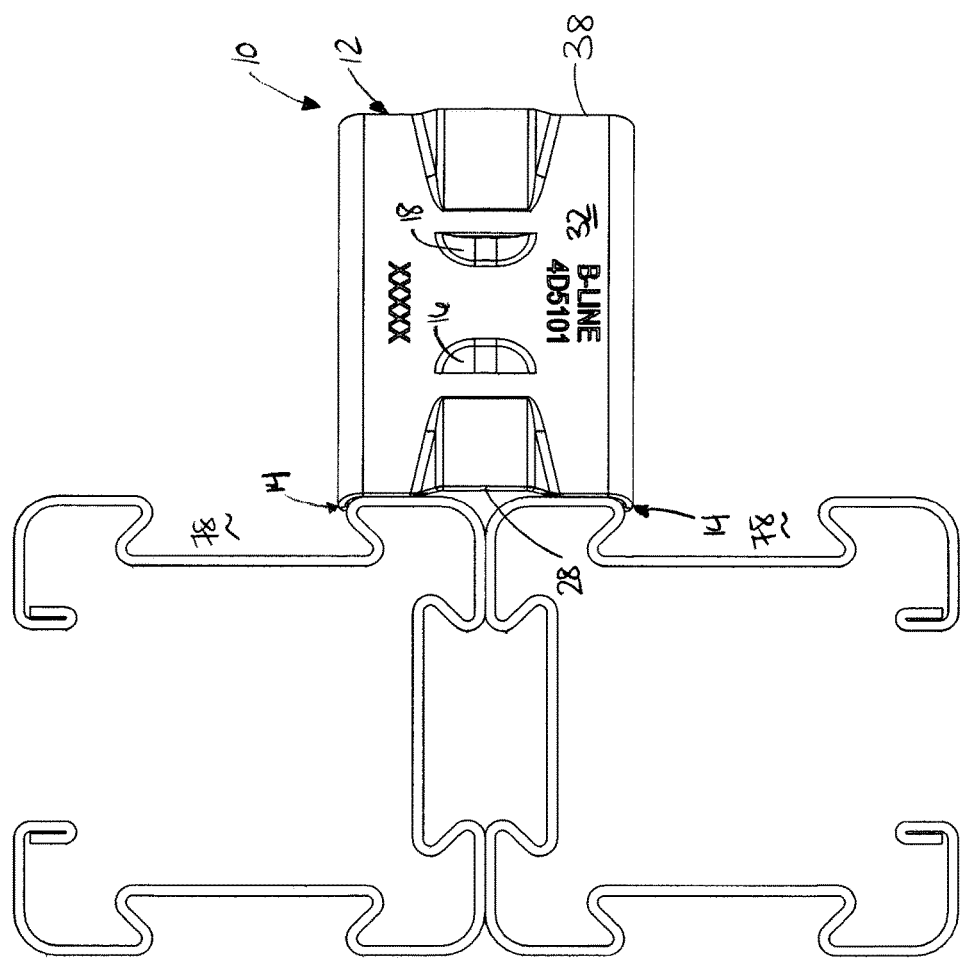
FIG. 12 is a front elevation of FIG. 11.
Figure 13:
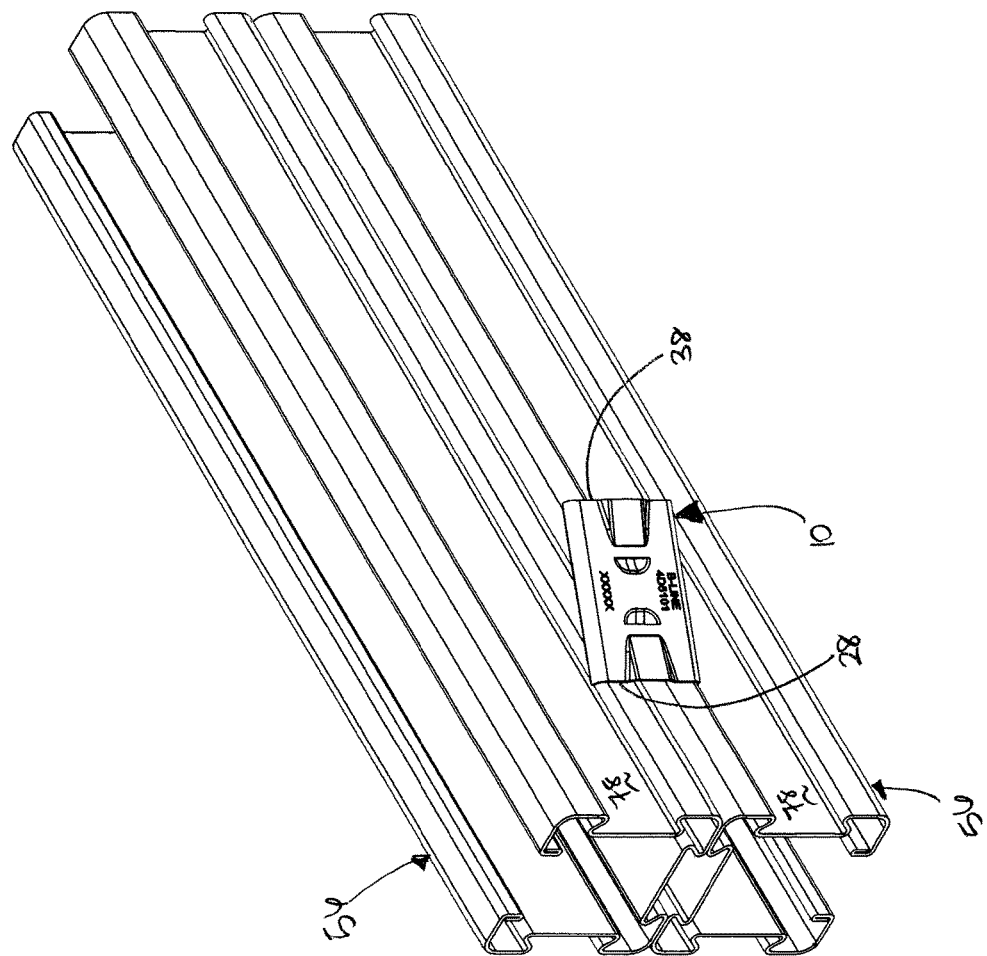
FIG. 13 is a perspective similar to FIG. 11, illustrating a second end of the fitting being moved toward the pieces of strut.
Figure 14:
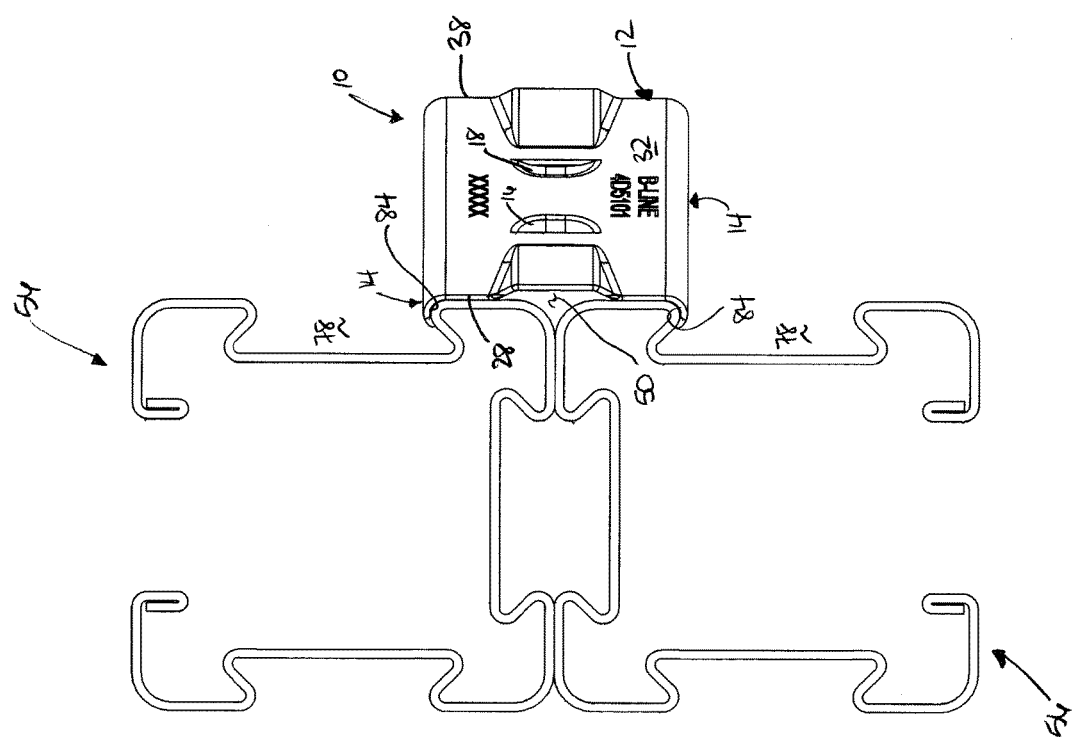
FIG. 14 is a front elevation of FIG. 13.
Corresponding reference characters indicate corresponding parts throughout the drawings.

In one method, the clip 10 can be used to connect two pieces of strut 56 to one another in a side-by-side configuration, as shown in FIGS. 7-9 (e.g., the pieces of strut are attached such that the lower side 62 of the first or top strut 56 is adjacent the lower side 62 of the second or bottom strut 56). It is understood that the clip 10 can be used to secure any one of the sides 62, 64, 66 of a first strut 56 to any one of the sides 62, 64, 66 of another strut. Moreover, more than two pieces of strut 56 can be secured together using additional clips 10.

As seen in FIGS. 7-9, the clip arms 14 are configured to engage respective flared side walls 80 of adjacent fitting grooves 78 of the two pieces of strut 56. In particular, the clip arms 14 hook into the adjacent fitting grooves 78 of the two adjacent pieces of strut 56 and the central portion 12 spans across the corresponding outside surfaces 76 of the pieces of strut between the adjacent fitting grooves to hold the pieces of strut in the side-by-side arrangement. The clip arms 14 hook into the fitting grooves 78 such that an elbow 84 of each clip arm engages a corresponding shoulder 86 of the fitting groove (at the transition between the outside surface 76 and the fitting groove side wall 80). The dimples 16, 18, specifically the rear surfaces 42, 44 thereof, engage the outside surfaces 76 of the pieces of strut 56 to create friction with the pieces of strut to enhance the connection. Engagement of the dimples 16, 18 with the outside surfaces 76 also pushes the clip arms 14 into engagement with shoulders 86 of the fitting grooves 78.

In one example, the clip 10 may be configured to slide on side-by-side pieces of strut 56 by inserting the clip into the fitting grooves 78 at the open ends of the grooves at the ends of the strut. In another example, the clip 10 may be resiliently deflectable and configured as a snap-fit component so the clip arms 14 can be snapped directly into the fitting grooves 78 at an intermediate point between the ends of the pieces of strut 56 without accessing either end of the strut. In another embodiment, the clip 10 may be snapped into position on side-by-side pieces of strut 56 at an intermediate point between the ends thereof by inserting one of the clip arms 14 into one of the fitting grooves 78. A force in the direction of outside surfaces 76 of the side-by-side pieces of strut 56 is then applied to the central portion 12, whereupon the free clip arm 14 and the central portion are resiliently deflected in a direction away from the outside surfaces of the pieces of strut. A continued application of force results in the free clip arm 14 sliding past the edge or shoulder 86 between the corresponding outside surface 76 and the flared side wall 80 defining the fitting groove 78, whereupon the clip 10 rebounds to its non-deflected configuration, and the corresponding clip arm 14 snaps into the fitting groove.

In one exemplary method, two pieces of strut 86 are brought together in side-by-side arrangement. The clip 10 is then snapped into the fitting grooves 78 of the pieces of strut 56 at any point between the ends of the strut. The clip 10 is snapped into the fitting grooves 78 such that the clip arms 14 extend into the fitting grooves and the elbows 84 engage of the clip arms engage the shoulders 86 of the fitting grooves. The clip 10 can be snapped into the fitting grooves 78 by initially bringing the first end 28 of the clip into engagement with the fitting grooves 78, and then subsequently moving the second end 38 of the clip into engagement with the fitting grooves (see FIGS. 10-14). Alternatively, the clip 10 can be slid into the open ends of the fitting grooves 78 of the side-by-side pieces of strut 56. Once the clip 10 is in position with the clip arms 14 extending into the fitting grooves 78, the clip holds the two pieces of strut 56 together in side-by-side arrangement.

If it is desired to move the clip 10 to a different location along the length of the pieces of strut 56, a tool can be inserted into one of the dimples 16, 18 to slide the clip to the desired position. For example, to move the clip 10 in a direction toward the first end 28 of the clip, a tool (e.g., screwdriver) is inserted into the first dimple 16 until it contacts the wall 30. The wall 30 of the first dimple 16 acts as a bearing surface for applying force via the screwdriver to slide the clip in a direction toward the first end 28 of the clip. To move the clip 10 in a direction toward the second end 38 of the clip, the screwdriver is inserted into the second dimple 18 to use the wall 40 as a bearing surface for applying force to slide the clip in a direction toward the second end. Thus, the clip 10 can easily be moved to any desired location along the length of the pieces of strut.

If it is desired to remove the clip 10 from the pieces of strut 56, a user can insert a tool (e.g., flathead screwdriver) into one of the pockets 50, 52 and use the tool to pry the clip off the pieces of strut. Thus, the clip 10 can easily be removed if necessary. Removing the clip may cause no damage to either the clip 10 or the strut 56, so the clip can be reused after removal.

As seen in FIGS. 8 and 9, an additional clip 10 can be installed on the opposite side of the pieces of strut 56 to hold the other side of the strut together. In addition, multiple clips 10 can be attached to pieces of strut 56 along their length to interconnect two pieces of strut along their length if desired or necessary for additional support (see, e.g., FIG. 7). Additional pieces of strut 56 can be attached by additional clips 10 (not shown).

As described above, the clip 10 is configured for engagement with and interconnection of two pieces of strut 56 having fitting grooves 78. The clip permits a user to simply, efficiently, and cheaply attach pieces of strut to each other. Workers can easily snap the clip onto the pieces of strut. In addition, the position of the clip can quickly and easily be adjusted along the length of the pieces of strut with a screwdriver. The clip can also easily be removed from the pieces of strut with a screwdriver.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, the fitting comprising:
   a central portion having opposite first and second ends, and opposite first and second sides, wherein the central portion is generally planar having an upper surface and a lower surface;
   a first clip arm extending downward from the first side of the central portion, wherein the first clip arm is configured to extend into the external fitting groove of the first piece of strut; and
   a second clip arm extending downward from the second side of the central portion, wherein the second clip arm is configured to extend into the external fitting groove of the second piece of strut,
   wherein the central portion defines a first and second dimples extending downward from the upper surface of the central portion, each of the first and second dimples configured to receive a tool for engaging the fitting,
   wherein the first clip arm includes a hook at a free end thereof, wherein the second clip arm includes a hook at a free end thereof.

2. The fitting set forth in claim 1, wherein the fitting has a length extending between the first and second ends of the central portion, wherein the first and second dimples are spaced apart from one another along the length of the fitting.

3. The fitting set forth in claim 2, wherein each of the first and second dimples has shallow end and a deep end, wherein the deep end of the first dimple is closer to the first end of the central portion than the shallow end of the first dimple, wherein the deep end of the second dimple is closer to the second end of the central portion than the shallow end of the second dimple.

4. The fitting set forth in claim 1, wherein the fitting is integrally formed from a single sheet of metal.

5. The fitting set forth in claim 1, wherein the central portion defines first and second pockets extending upward from the upper surface of the central portion, each of the first and second pockets configured to receive a tool for engaging the fitting.

6. The fitting set forth in claim 5, wherein the first pocket is adjacent the first end of the central portion, wherein the second pocket is adjacent the second end of the central portion.

7. The fitting set forth in claim 6, wherein an interior space defined by the first pocket is accessible through the first end of the central portion, wherein an interior space defined by the second pocket is accessible through the second end of the central portion.

8. The fitting set forth in claim 6, wherein the first and second dimples are disposed between the first and second pockets.

9. A fitting for connecting first and second pieces of strut to one another, wherein each piece of strut includes an elongate strut body having opposite longitudinal ends, a length extending between the opposite longitudinal ends, and a fitting side defining an external fitting groove extending lengthwise of the body, the fitting comprising:
   a central portion having opposite first and second ends, and opposite first and second sides, wherein the central portion is generally planar having an upper surface and a lower surface;
   a first clip arm extending downward from the first side of the central portion, wherein the first clip arm is configured to extend into the external fitting groove of the first piece of strut; and
   a second clip arm extending downward from the second side of the central portion, wherein the second clip arm is configured to extend into the external fitting groove of the second piece of strut,
   wherein the central portion defines first and second pockets extending upward from the upper surface of the central portion, each of the first and second pockets configured to receive a tool for engaging the fitting,
   wherein the first clip arm includes a hook at a free end thereof, wherein the second clip arm includes a hook at a free end thereof.

10. The fitting set forth in claim 9, wherein the fitting has a length extending between the first and second ends of the central portion, wherein the first and second pockets are spaced apart from one another along the length of the fitting.

11. The fitting set forth in claim 10, wherein the first pocket has an open end at a first longitudinal end of the central portion, wherein the second pocket has an open end at a second longitudinal end of the central portion.

12. The fitting set forth in claim 11, wherein each of the first and second pockets taper away from the corresponding open end.

13. The fitting set forth in claim 9, wherein the fitting is integrally formed from a single sheet of metal.

14. The fitting set forth in claim 9, wherein the central portion defines a first and second dimples extending downward from the upper surface of the central portion, each of the first and second dimples configured to receive a tool for engaging the fitting.

15. The fitting set forth in claim 14, wherein the fitting has a length extending between the first and second ends of the central portion, wherein the first and second dimples are spaced apart from one another along the length of the fitting.

16. The fitting set forth in claim 15, wherein each of the first and second dimples has shallow end and a deep end, wherein the deep end of the first dimple is closer to the first end of the central portion than the shallow end of the first dimple, wherein the deep end of the second dimple is closer to the second end of the central portion than the shallow end of the second dimple.

17. The fitting set forth in claim 15, wherein the first and second dimples are disposed between the first and second pockets.

\* \* \* \* \*